United States Patent
Ogura

Patent Number: 5,936,363
Date of Patent: Aug. 10, 1999

[54] USER CONTROLLED DEFLECTION APPARATUS FOR CORRECTING UPPER AND LOWER DISTORTIONS OF A CRT

[75] Inventor: Toshiyuki Ogura, Kanagawa, Japan

[73] Assignee: Sony Corporation, Tokyo, Japan

[21] Appl. No.: 08/889,099

[22] Filed: Jul. 7, 1997

[30] Foreign Application Priority Data

Jul. 8, 1996 [JP] Japan .................. 8-178132

[51] Int. Cl.$^6$ .............. H01J 29/76; H04N 3/16; H04N 3/23
[52] U.S. Cl. .......... 315/371; 315/368.18; 315/368.26; 315/370; 315/403
[58] Field of Search .............. 315/368.26, 371, 315/403, 368.18, 368.25, 368.28, 370, 398

[56] References Cited

U.S. PATENT DOCUMENTS

| | | | |
|---|---|---|---|
| 3,430,099 | 2/1969 | Ashley | 315/368.26 |
| 4,093,895 | 6/1978 | Collette | 315/371 |
| 4,818,919 | 4/1989 | Kobayashi et al. | 315/371 |
| 5,079,486 | 1/1992 | Honda et al. | 315/371 |
| 5,142,205 | 8/1992 | Yabase et al. | 315/368.26 |
| 5,177,411 | 1/1993 | Kii | 315/368.18 |
| 5,248,920 | 9/1993 | Gioia et al. | 315/368.26 |
| 5,274,308 | 12/1993 | Park et al. | 315/368.26 |

*Primary Examiner*—Edward P. Westin
*Assistant Examiner*—Shane R. Gardner
*Attorney, Agent, or Firm*—Jay H. Maioli

[57] ABSTRACT

A system to correct and adjust horizontal-direction pincushion and barrel distortions of scanning lines caused at upper and lower portions of a picture screen of a cathode-ray tube includes a pair of coils provided at a neck portion of the cathode-ray tube. An orbit of an electron beam made incident on a deflection center is shifted in the upper and lower directions by a magnetic field generated by the coils, thereby correcting distortion of scanning lines at upper and lower portions of a display screen of the cathode-ray tube.

4 Claims, 2 Drawing Sheets

USER CONTROLLED DEFLECTION APPARATUS FOR CORRECTING UPPER AND LOWER DISTORTIONS OF A CRT

BACKGROUND OF THE INVENTION

The present invention relates to a deflection apparatus suitable for use in a receiver employing a color cathode-ray tube, for example.

For example, a color cathode-ray tube displays a picture by converging three electron beams emitted from an electron gun through respective predetermined orbits into a deflection center to further deflect the electron beams by using a sawtooth wave signal having a horizontal period and a sawtooth wave signal having a vertical period or the like for scanning the whole screen.

If such deflection of electron beams for scanning is carried out by using simple sawtooth wave signals having horizontal and vertical periods, so-called pincushion and barrel distortions occur in the vertical direction on a scanning line. Therefore, for correcting such distortion in the vertical-direction, a horizontal-deflection current has been modulated in each vertical period, thereby such distortion of a picture being corrected.

However, while the above deflection for scanning is being carried out, horizontal-direction pincushion and barrel distortions occur in a scanning line at upper and lower portions of a picture screen of a cathode-ray tube. Therefore, a picture is corrected in order to cancel such horizontal-direction distortion (referred to as an N/S pincushion distortion).

When such horizontal-direction distortion is electrically corrected, for example, a vertical deflection current is modulated in each horizontal period. Therefore, a general modulating circuit or the like cannot correct such distortion in view of frequency characteristics. As a result, such modulation has been carried out by using a resonant circuit. However, the resonant circuit is applied only to frequencies of a limited number, and hence if the resonant circuit is used for a plurality of frequencies, the resonant circuit must have a complicated arrangement for switching a resonance frequency and so on.

A method of carrying out such correction by attaching a permanent magnet to a deflection yoke is known. If this method is employed, it is impossible to change a correction amount depending upon an individual case. For example, it is impossible to adjust the correction amount in order to correct characteristics which are different depending upon display apparatus. Moreover, it is impossible to adjust the correction amount in response to a condition which a user desires and so on.

SUMMARY OF THE INVENTION

In view of such aspects, it is an object of the present invention to provide a deflection apparatus which can satisfactory correct horizontal-direction pincushion and barrel distortions of a scanning line occurring at upper and lower portions of a picture screen of a cathode-ray tube and adjust a picture displayed on the picture screen.

According to an aspect of the present invention, a deflection apparatus includes a pair of coils provided at a neck portion of a cathode-ray tube. An orbit of an electron beam made incident on a deflection center is shifted in the upper and lower directions by a magnetic field generated by the coils, thereby distortion of scanning lines at upper and lower portions of a display screen being corrected.

DESCRIPTION OF THE PREFERRED EMBODIMENT

Figure 1:
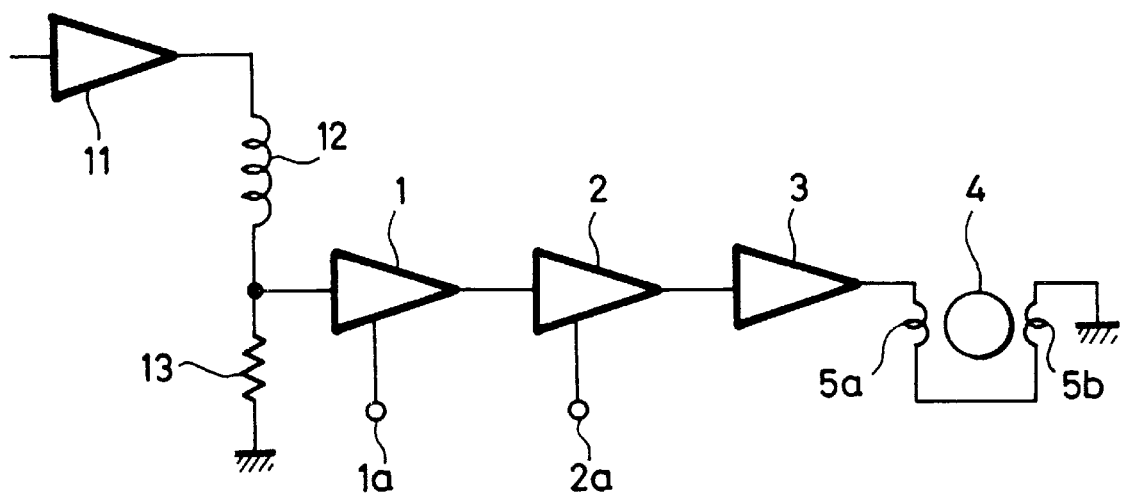
FIG. 1 is a diagram showing an example of an arrangement of a deflection apparatus to which the present invention is applied.

A deflection apparatus according to an embodiment of the present invention will hereinafter be described with reference to the accompanying drawings. FIG. 1 is a block diagram showing an example of an arrangement of a deflection apparatus to which the present invention is applied.

In FIG. 1, for example, a vertical deflection current outputting circuit 11 supplies a vertical deflection current to one end of a vertical deflection yoke 12. The other end of the vertical deflection yoke 12 is grounded through a current detection resistor 13. Thus, by the vertical deflection yoke 12, a vertical deflection of electron beams from the above deflection center is carried out, and a sawtooth wave signal having a vertical period is derived from one end of the current detection resistor 13.

The sawtooth wave signal derived from the one end of the current detection resistor 13 is supplied successively to an amplifier 1 for controlling an amplitude and a polarity thereof and an amplifier 2 for controlling a DC level thereof. The amplifiers being connected in series. A signal from the amplifier 2 is supplied to a voltage-current conversion amplifier 3. A current signal from the amplifier 3 is supplied to one end of a series circuit formed of a pair of coils 5a, 5b provided across a neck portion of a cathode-ray tube 4. The other end of the series circuit is grounded.

Figure 2:
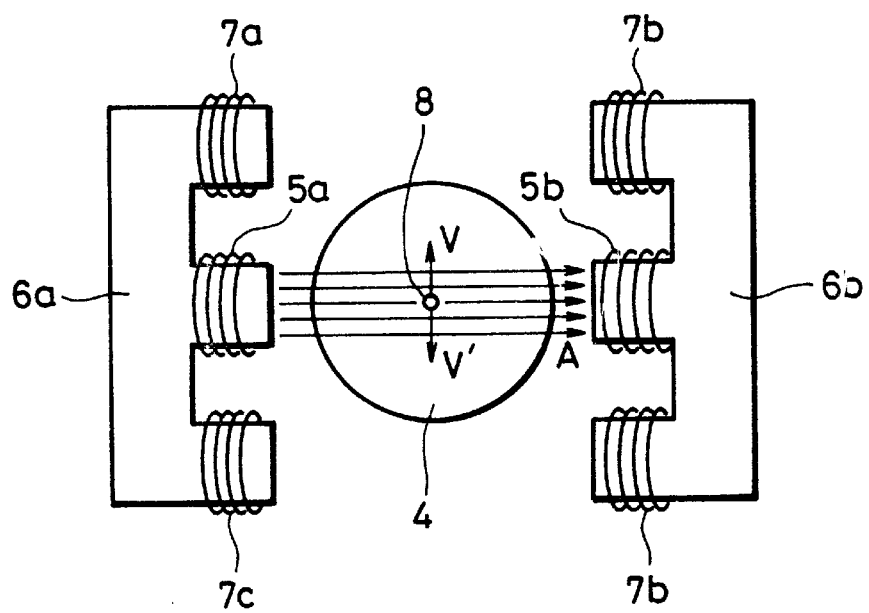
FIG. 2 is a diagram showing a main part of the deflection apparatus shown in FIG. 1, by way of example.

FIG. 2 is a diagram showing an arrangement of the neck portion of the cathode-ray tube 4 and a pair of the coils 5a, 5b. In FIG. 2, E-shaped cores 6a, 6b are provided at the horizontal-direction outer sides of the neck portion of the cathode-ray tube 4 where three electron beams from an electron gun (not shown) are converged. The coils 5a, 5b are respectively wound around center leg portions of the E-shaped cores 6a, 6b. Beam shape correction coils 7a, 7c are wound around both side leg portions of the E-shaped core 6a, respectively, and beam shape correction coils 7b, 7d are wound around both side leg portions of the E-shaped core 6b.

In the deflection apparatus, when a current flows through a pair of the coils 5a, 5b, for example, a magnetic field traversing the neck portion of the cathode-ray tube 4 is generated as shown by arrows A in FIG. 2. As a result, a force is applied to an electron beam 8 passing through the magnetic field in the vertical direction depending upon the direction of the magnetic field, and hence an orbit of the electron beam 8 is shifted vertically as shown by arrows V and V' in FIG. 2.

Figure 3A:
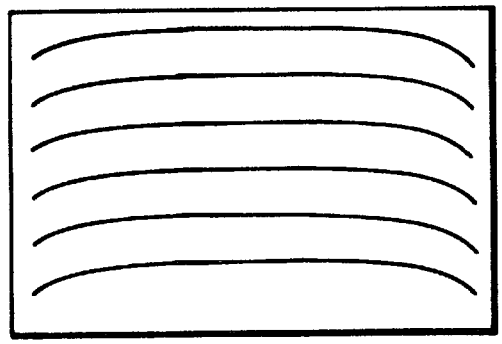
FIGS. 3A and 3B are diagrams used to explain an operation of the deflection apparatus shown in FIG. 1.
Figure 3B:
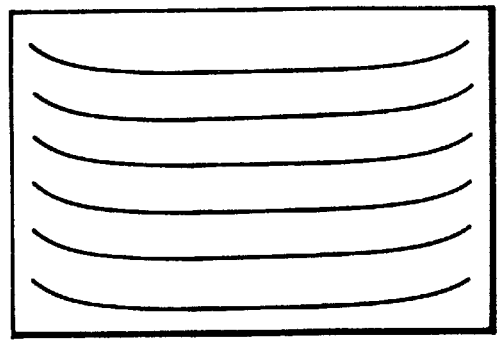

If the orbit of the electron beam 8 is shifted in the upper direction in the color cathode-ray tube 4, distortion of the scanning lines shown in FIG. 3A occurs. If the orbit of the electron beam 8 is shifted in the lower direction in the color cathode-ray tube 4, distortion of the scanning lines shown in FIG. 3B occurs. The above distortions of the scanning lines do not occur when a raster position and a raster size are changed because of a vertical deflection magnetic field.

If the orbit of the above electron beam 8 is shifted upward and thereafter the raster is shifted downward by the vertical deflection magnetic field by an amount of the above upward movement, it is possible, without any positional change of the scanning line displayed on the picture screen, to distort a scanning line at the upper portion of the picture screen in a barrel shape and to distort the raster at the lower portion of the picture screen in a pincushion shape.

If the orbit of the electron beam 8 is shifted downward, then the distortion reverse to the above distortion occurs.

Therefore, a current is supplied to a pair of the coils 5a, 5b by using a sawtooth wave signal having a vertical period to generate a rightward magnetic field when the electron beam scans the upper portion of the picture screen and to generate a leftward magnetic field when the electron beam scans the lower portion of the picture screen. Thus, when the electron beam scans the upper portion of the picture screen, the orbit of the electron beam is shifted upward to generate the upward barrel distortion, and when the electron beam scans the lower portion of the picture screen, the orbit of the electron beam is shifted downward to generate the downward barrel distortion.

Figure 4A:
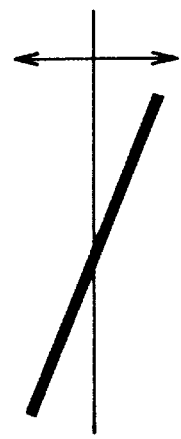
FIGS. 4A and 4B are diagrams used to explain an operation of the deflection apparatus shown in FIG. 1.
Figure 4B:
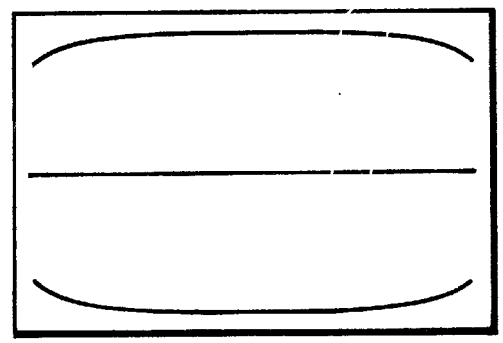

Specifically, as shown in FIG. 4A, when the electron beam scans the upper portion of the picture screen, the orbit of the electron beam is shifted upward by using the above sawtooth wave signal having a vertical period, and when the electron beam scans the lower portion of the picture screen, the orbit of the electron beam is shifted downward by using the above sawtooth wave signal having a vertical period. At the same time, the raster size is reduced by the vertical deflection magnetic field. With this processing, as shown in FIG. 4B, for example, the barrel distortions are allowed to occur at both of the upper and lower portions of the picture screen. If the polarity of the sawtooth wave signal is set in the reverse, the pincushion distortions are allowed to occur at both the upper and lower portions of the picture screen.

If each of the above respective conditions is set in the reverse, then it is possible to correct the horizontal-direction pincushion and barrel distortions (called N/S pincushion distortions) of scanning lines which occur at the upper and lower portions of the picture screen of the cathode-ray tube.

According to the deflection apparatus of the present invention, since the current that is modulated so as to have the sawtooth wave having a vertical period flows through a pair of the coils 5a, 5b attached to the neck portion of the cathode-ray tube 4 in order to change its amplitude or polarity and then the raster size changed thereby is restored by the application of the vertical deflection magnetic field, it is possible to distort the scanning lines in the barrel shape or the pincushion shape at the upper and lower portions of the picture screen and hence it is possible to correct the distortion which has occurred originally.

If the distortions at the upper and lower portion of the picture screen are unbalanced, the DC level of the sawtooth wave signal flowing through the coils 5a, 5b is changed. Then, the raster position that was shifted vertically because of the change of the DC level is returned to its original position by the vertical deflection magnetic field. Thus, it is possible to correct the unbalanced distortions.

In this deflection apparatus, the distortion amounts of the scanning lines at the upper and lower portions of the picture screen are uniquely determined depending upon a vertical deflection position on the picture screen of the cathode-ray tube (i.e., a deflection current value). Thus, if a signal having a waveform obtained by subjecting the vertical deflection current to a current/voltage conversion is employed as an original signal, then a correction current, corresponding to a certain vertical position on the picture screen and flowing through the coils, becomes free from any influences of the raster size, a vertical linearity, a vertical deflection frequency and so on, which allows a predetermined correction amount to be constantly obtained.

Therefore, according to the deflection apparatus of the present invention, since a pair of the coils are provided at the neck portion of the cathode-ray tube and the orbit of the electron beam made incident on the deflection center is shifted vertically (i.e., in the upper and lower directions) by the magnetic field generated by the coils, it is possible to constantly and satisfactorily correct and adjust the horizontal-direction pincushion and barrel distortions of the scanning lines which occur at the upper and lower portions of the picture screen of the cathode-ray tube.

According to the deflection apparatus of the present invention, since the correction current flowing through the coils allows the predetermined correction amount to be constantly obtained regardless of the raster size, the vertical linearity, the vertical deflection frequency and so on, the correction can be effectively effected even in a so-called multiscan type cathode-ray tube which can vary horizontal/vertical deflection frequencies, a cathode-ray tube for a wide television receiver in which a vertical raster size is changed in response to a picture mode, and so on.

In the above deflection apparatus, if a control terminal 1a for controlling the amplitude and polarity of the signal in the amplifier 1 and a control terminal 2a for controlling the DC level of the signal in the amplifier 2 are provided, then it is possible for a user to optionally adjust the correction amounts with respect to the above elements, for example. Thus, it is possible to optionally correct the distortion in accordance with what the user desires.

In the deflection apparatus, the locations and positions of the coils 5a, 5b are not limited to a point where the three electron beams from the electron gun are converged. The coils 5a, 5b may be provided at any position between the electron gun and the deflection center as long as the cathode-ray tube employs an in-line type electron gun in which three electron beams arranged in a line in the horizontal direction are emitted. In this case, it is a necessary condition that three electron beams are of an inline type and arranged horizontally.

Moreover, if the coils 5a, 5b are provided in series with respect to the vertical deflection yoke 12 and impedances thereof are determined, then the above correction can be carried out. With this arrangement, if only the horizontal-direction pincushion and barrel distortions of the scanning lines are corrected, then the correction can be carried out without any adjustment.

In the deflection apparatus, if the sawtooth signal for a vertical period supplied to a pair of the coils 5a, 5b is further processed in a nonlinear fashion, it is possible to correct, for example, the vertical middle pincushion/barrel distortions and so on.

According to the deflection apparatus of the present invention, since a pair of the coils are provided at the neck portion of the cathode-ray tube and the orbit of the electron beam made incident on the deflection center is shifted vertically by application of the magnetic field generated by the coils to thereby correct the distortions of the scanning lines at the upper and lower portions of the picture screen, it is possible to satisfactorily correct and adjust the horizontal-direction pincushion and barrel distortions of the scanning lines which occur at the upper and lower portions of the picture screen of the cathode-ray tube.

While in this embodiment the voltage-current conversion amplifier 3 requires a circuit for both power sources because the other end of the series circuit formed of the coils 5a, 5b is grounded, if amplifiers are provided at both ends of the series circuit formed of the coils 5a, 5b to form a so-called balanced amplifier, then the deflection apparatus can be driven with a single power source.

Therefore, according to the deflection apparatus of the present invention, since a pair of the coils 5a, 5b are provided at the neck portion of the cathode-ray tube 4 and the orbit of the electron beam made incident on the deflection center is shifted vertically (i.e., in the upper and lower directions) by the magnetic field generated by the coils, it is possible to constantly and satisfactorily correct and adjust the horizontal-direction pincushion and barrel distortions of the scanning lines which occur at the upper and lower portions of the picture screen of the cathode-ray tube.

According to the deflection apparatus of the present invention, since the correction current flowing through the coils allows the predetermined correction amount to be constantly obtained regardless of the raster size, the vertical linearity, the vertical deflection frequency and so on, the correction can be effectively carried out even in a so-called multiscan type cathode-ray tube which can vary horizontal/vertical deflection frequencies as well as in, a cathode-ray tube for a wide television receiver in which a vertical raster size is changed in response to a picture mode, and so on.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A deflection apparatus for a cathode ray tube comprising:
   a circuit for producing a sawtooth current waveform having a vertical period, said circuit including:
   sawtooth voltage producing means for producing a sawtooth voltage signal having said vertical period based on a vertical deflection current,
   a first user-controlled amplifier having a first control terminal for controlling by a user an amplitude and a polarity of said sawtooth voltage signal,
   a second user-controlled amplifier having a second control terminal for controlling by said user a direct-current level of an output of said first user-controlled amplifier, and
   a voltage-to-current conversion amplifier for converting an output of said second user-controlled amplifier into said sawtooth current waveform; and
   a pair of coils receiving said sawtooth current waveform, wherein said pair of coils are provided at a neck portion of said cathode-ray tube for shifting an orbit of an electron beam incident on a deflection center of a display screen of said cathode-ray tube in one of an upper and lower direction by a magnetic field generated by said pair of coils, thereby correcting distortion of scanning lines at upper and lower portions of the display screen.

2. The deflection apparatus according to claim 1, wherein said pair of coils are attached to said neck portion of said cathode-ray tube in a horizontal direction relative to said scanning lines.

3. The deflection apparatus according to claim 2, wherein said sawtooth voltage producing means includes:
   a vertical deflection yoke;
   a vertical deflection current producing circuit for feeding said vertical deflection current to one terminal of said vertical deflection yoke; and
   a resistor connected to ground and to another terminal of said vertical deflection yoke, wherein said sawtooth voltage signal is produced across said resistor.

4. The deflection apparatus according to claim 3, further comprising first and second E-shaped cores, wherein each coil of said pair of is includes first and second is wound around respective center leg portions of said first and second E-shaped cores.

* * * * *